(12) United States Patent
Triulzi et al.

(10) Patent No.: US 7,767,763 B2
(45) Date of Patent: Aug. 3, 2010

(54) FLUOROELASTOMERS

(75) Inventors: Francesco Triulzi, Milan (IT); Margherita Albano, Milan (IT); Milena Stanga, Varese (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 12/161,638

(22) PCT Filed: Jan. 15, 2007

(86) PCT No.: PCT/EP2007/050350

§ 371 (c)(1),
(2), (4) Date: Jul. 21, 2008

(87) PCT Pub. No.: WO2007/082867

PCT Pub. Date: Jul. 26, 2007

(65) Prior Publication Data

US 2009/0088529 A1    Apr. 2, 2009

(30) Foreign Application Priority Data

Jan. 19, 2006    (IT) ............................ MI2006A0083

(51) Int. Cl.
*C08F 14/18*    (2006.01)
(52) U.S. Cl. .................. 525/326.2; 525/200; 525/199; 525/231; 525/331.1; 526/242; 526/266; 526/247; 526/253; 526/250; 526/252; 526/249; 526/255
(58) Field of Classification Search .......... 525/200, 525/326.2, 331.1; 526/253, 252, 247
See application file for complete search history.

(56) References Cited

U.S. PATENT DOCUMENTS

| 3,085,083 | A | * | 4/1963 | Schreyer ................. 525/326.2 |
| 3,810,874 | A | * | 5/1974 | Mitsch ........................ 528/70 |
| 5,696,216 | A | | 12/1997 | Krueger et al. |
| 6,294,627 | B1 | * | 9/2001 | Worm et al. ................. 526/247 |
| 2003/0088040 | A1 | * | 5/2003 | Arrigoni et al. ............. 526/255 |
| 2005/0245691 | A1 | * | 11/2005 | Stanga et al. ............. 525/331.1 |
| 2007/0093625 | A1 | * | 4/2007 | Arrigoni et al. ............. 526/253 |

FOREIGN PATENT DOCUMENTS

| EP | 1 260 550 A1 | | 11/2002 |
| EP | 1 304 341 A2 | | 4/2003 |
| JP | 2004-163927 | * | 6/2004 |
| JP | 2004-163927 A | | 6/2004 |

* cited by examiner

*Primary Examiner*—Vasu Jagannathan
*Assistant Examiner*—Robert C Boyle
(74) *Attorney, Agent, or Firm*—Arent Fox LLP.

(57) ABSTRACT

VDF-based curable fluoroelastomers, having a glass transition temperature lower than −49° C., preferably lower than −50° C., and having the following composition, as percent moles: A) from 25% to 50%, preferably from 30% to 45%, of the monomer of formula: $CF_2{=}CFOCF_2OCF_3$ (a); B) one or more (per)fluorinated comonomers having at least one unsaturation of ethylene type in amounts from 75% to 50%; preferably from 70% to 55%; said one or more comonomers comprising vinylidene fluoride (VDF) in amounts from 50% to 75% on the total of the monomer moles; the sum of the molar percentages of the monomers being 100%; said fluoroelastomers containing an amount of —COF end groups in the polymer lower than the sensitivity limit of the method reported in the description.

22 Claims, No Drawings

FLUOROELASTOMERS

CROSS-REFERENCE TO RELATED APPLICATION

This application is a National Stage entry of International Application No. PCT/EP2007/050350, filed Jan. 15, 2007, the entire specification claims and drawings of which are incorporated herewith by reference.

The present invention relates to VDF fluoroelastomers showing a Tg lower than −49° C., preferably lower than or equal to −50° C., and an improved combination of mechanical properties and compression set in a wide range of temperatures, both at high and at low temperatures.

More specifically the present invention relates to fluoroelastomers having a Tg lower than or equal to −50° C. and substantially —COF end group free, these end groups being undetectable by the method indicated hereinafter. The fluoroelastomers of the present invention show an improved molecular weight as indicated by the Mooney viscosity and are obtainable by a polymerization process showing an improved productivity.

It is well known that fluoroelastomers are polymers particularly useful in the automotive, aerospace, oil, petrochemical and electronic industry thanks to their thermal and chemical resistance properties, good mechanical properties and compression set. However it is required that these polymers show an improved combination of the above properties in a wide temperature range, both at high and at low temperatures.

Various fluoroelastomers are known, however in the prior art the —COF polymer end group values are not reported. The Applicant, after deep research, has found that when the polymers have —COF end groups, the fluoroelastomers do not show high mechanical and elastomeric properties.

For various prior art fluoroelastomers, the glass transition temperature (Tg) is reported. However in the prior art the combination of a low Tg, lower than −49° C., preferably lower than or equal to −50° C., and improved mechanical and elastomeric properties at high and at low temperatures is not obtained.

U.S. Pat. No. 6,294,627 describes VDF fluoroelastomers containing perfluorinated ethers of formula:

$$CF_2=CFO-(CF_2)_{mo}-(O(CF_2)_{po})_{no}-OR_f^1$$

wherein $R_f^1$ is a $C_1$-$C_4$ alkyl perfluorinated group, mo=1-4, no=0-6 and po=1-2. These copolymers have a Tg lower than or equal to −50° C. and an oxygen/carbon (O/C) ratio of at least 0.2. According to this patent, the higher the O/C ratio the lower the Tg. However the influence of the O/C ratio variation is qualitative and not quantitative. As a matter of fact, the Tg can be varied also through other factors, for example the molecular weight and the presence of other comonomers in the copolymers as, for example, tetrafluoroethylene (TFE), and the length of the comonomer sequences. According to this patent, at least two ways can be used to increase the O/C ratio, optionally in combination: to lengthen the side group (pendent group) so as to have more oxygen atoms, or to increase the percentage by moles of the perfluoroalkoxyvinylether in the copolymer. It is well known that, by increasing the side units containing more oxygen atoms, the Tg of the amorphous copolymers decreases. However there is the drawback of a drastic decrease of the vinylether reactivity by using vinylethers having long side chains. Therefore it difficult, or almost impossible, to obtain polymers having a high molecular weight, hence with good mechanical properties.

By increasing the amount of said vinylethers in the polymer, very low Tg, lower than −50° C., are obtained, but with poor mechanical properties.

As said, by increasing the number of oxygen atoms in the side chain, for example with a number of oxygen atoms more than 2, as in U.S. Pat. No. 6,294,627, the perfluoroalkoxyvinylether reactivity drastically decreases. Due to this it is difficult to obtain polymers containing a high molar percentage of perfluoroalkoxyvinylethers with a sufficiently high molecular weight and therefore endowed with good mechanical and sealing properties.

It is known from EP 1,148,072 that a particular class of perfluorinated vinylethers can be used for obtaining fluoroelastomeric polymers with Tg lower than those obtainable by using perfluoroalkoxyvinylethers. Tests carried out by the Applicant have shown that, by using as monomer MOVE 1 $CF_2=CF-O-CF_2-O-CF_2CF_3$, in amounts of about 30% by moles, a fluoroelastomer having a Tg of −44° C. with good mechanical properties is obtained. By increasing the MOVE 1 content for example about 40% by moles, the Tg is −47° C. but the mechanical properties are very poor.

Patent application EP 1,621,557 describes VDF fluoroelastomers showing a Tg lower than −35° C. and an improved combination of mechanical and sealing properties in a wide range of temperatures, both at high and at low temperatures. The preferred fluoroelastomers comprise the following monomers (in percent by moles): $CF_2=CFOCF_2OCF_3$ (monomer a)) from 1% to 99% and one or more (per)fluorinated comonomers having at least one ethylenic unsaturation from 1% to 99%, preferably from 1% to 95%. The comonomers comprise vinylidene fluoride (VDF) from 1% to 85% by moles on the total of the monomer moles to have a fluoroelastomer. Example 2 of this patent application describes a copolymer containing (in percent by moles) 75% of the monomer a) and 25% of VDF, having Tg=−54.3° C. Example 4 describes a copolymer containing 21% of the monomer a) and 79% of VDF having Tg=−47.9° C. No indication is given of the vinylether comonomer amount necessary to obtain Tg lower than −49° C., preferably lower than −50° C., without using very high molar amounts of the monomer a). As a matter of fact, from the commercial point of view, it is required to have available polymers with a Tg preferably lower than or equal to −50° C. by using low amounts of monomer a), in particular much lower than 75% by moles. Indeed this is unadvantageous from the industrial point of view as the synthesis of perfluoroalkoxyvinylethers of monomer a) is very expensive.

EP 1,304,341 describes fluoroelastomers containing fluoroalkoxyvinylethers of formula $CFX_A=CX_AOCF_2PR_A$, wherein $X_A$=F, H; $R_A$ is $C_2$-$C_6$ perfluoroalkyl, perfluoroxyalkyl or $C_5$-$C_6$ cyclic (per)fluoroalkyl. In particular the following perfluoroalkoxyvinylethers are described: $CF_2=CFOCF_2OCF_2CF_3$ (MOVE 1) and $CF_2=CFOCF_2OCF_2CF_2OCF_3$ (MOVE 2). In the Examples fluoroelastomers containing no more than 19% of these perfluoroalkoxyvinylethers are described. Tests carried out by the Applicant have shown that said fluoroelastomers have polymer end groups of —COF type. As said these terminal groups worsen the mechanical properties at high temperatures and the thermal resistance of said polymers.

The need was felt to have available fluoroelastomers having the following combination of properties:
- Tg lower than −49° C., more preferably lower than or equal to −50° C.;
- good mechanical and sealing properties;
- reduced amount of vinylether monomer, in the range 25%-50%, preferably 30%-45% to prepare copolymers.

The Applicant has surprisingly and unexpectedly found fluoroelastomers solving the above technical problem.

An object of the present invention are VDF curable fluoroelastomers having a glass transition temperature lower than −49° C., preferably lower than −50° C., with the following composition (in percent by moles):

A) from 25% to 50%, preferably from 30% to 45%, of a monomer of formula:

$$CF_2=CFOCF_2OCF_3 \qquad (a);$$

B) one or more (per)fluorinated comonomers having at least one ethylene type unsaturation, in amounts from 75% to 50%, preferably from 70% to 55%; these comonomers comprising vinylidene fluoride (VDF) in amounts from 50% to 75% on the total of the monomer moles;

the sum of the molar percentages of the monomers being 100%, the fluoroelastomers having an amount of —COF end polymer groups, bands at 1,900-1,830 cm$^{-1}$, lower than the sensitivity limit of the following method: at the end of the polymerization of the monomer the polymer is isolated through coagulation by freezing and subsequent defrosting; then the polymer is washed twice with demineralized water and dried in stove up to a constant weight; the —COF end polymer groups are determined by FT-IR spectroscopy on a polymer film having a thickness from 50 to 300 micron by initially scanning between 4000 cm$^{-1}$ and 400 cm$^{-1}$ to obtain the initial spectrum keeping the film for 12 hours in an environment saturated with ammonia vapours, and then recording the IR final spectrum under the same conditions of the initial IR spectrum; subtraction from the initial spectrum the final spectrum to obtain the "difference spectrum", which is normalized by the following equation:

$$\frac{\text{"Difference spectrum"}}{[\text{film weight (g)/film area (cm}^2)]}$$

then the optical densities related to the —COF end groups which have reacted with the ammonia vapours are measured and converted into mmoles/kg of polymer using the extinction coefficients reported in Table 1, page 73 of the publication by M. Pianca et Al. "End groups in fluoropolymers", J. Fluorine Chem. 95 (1999), 71-84 (herein incorporated by reference); the method sensitivity limit being 0.05 mmoles/Kg.

More in particular the —COF end group amount in the polymer is determined by using the Nicolet® Nexus FT-IR equipment (256 scannings, resolution 2 cm$^{-1}$).

As said the polymers of the invention do not show any bands of residual —COF end groups at 1,900-1,830 cm$^{-1}$.

Preferably in the fluoroelastomers of the invention the composition formed of monomer (a) 40% by moles and VDF 60% by moles is excluded.

In the fluoroelastomers of the invention comonomers B) different from VDF are selected from the following:

$C_2$-$C_8$ perfluoroolefins, for example TFE, hexafluoropropene, hexafluoroisobutene;

perfluoroalkylvinylethers of formula $CF_2=CFORf$ wherein Rf is a $C_1$-$C_2$ perfluoroalkil, preferably Rf=$CF_3$.

Preferred comonomers B) different from VDF are tetrafluoroethylene (TFE) and/or perfluoromethylvinylether (MVE).

The fluoroelastomers according to the present invention preferably comprise also units deriving from bis-olefins of general formula:

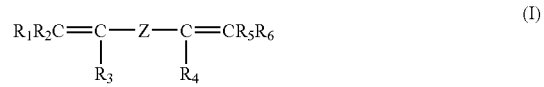

wherein:

$R_1, R_2, R_3, R_4, R_5, R_6$, equal to or different from each other, are H or $C_1$-$C_5$ alkyls;

Z is a $C_1$-$C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

The amount of units in the polymer backbone deriving from the bis-olefins of formula (I) is generally from 0.01 to 1.0% by moles, preferably from 0.03 to 0.5% by moles, still more preferably from 0.05 to 0.2 moles per 100 moles of the monomeric units, constituting the basic fluoroelastomer structure; the monomer total sum being 100%.

In formula (I), Z is preferably a $C_4$-$C_{12}$, more preferably $C_4$-$C_8$, perfluoroalkylene radical, while $R_1, R_2, R_3, R_4, R_5, R_6$ are preferably hydrogen; when Z is a (per)fluoropolyoxyalkylene radical, it can comprise units selected from the following:

—$CF_2CF_2O$—, —$CF_2CF(CF_3)O$—, —$CFX_{10}$—
wherein $X_1$=F, $CF_3$,

—$CF_2CF_2CF_2O$—, —$CF_2$—$CH_2CH_2O$—,
—$C_3F_6O$—.

Preferably Z has formula:

$$-(Q)_p\text{-}CF_2O\text{—}(CF_2CF_2O)_m(CF_2O)_n\text{—}CF_2\text{-}(Q)_p\text{-} \qquad (II)$$

wherein: Q is a $C_1$-$C_{10}$ alkylene or oxyalkylene radical; p is 0 or 1; m and n are numbers such that the m/n ratio is between 0.2 and 5 and the molecular weight of said (per)fluoropolyoxyalkylene radical is in the range 500-10,000, preferably 700-2,000.

Preferably Q is selected from:

—$CH_2OCH_2$—; —$CH_2$—$O(CH_2CH_2O)_xCH_2$—, s being=1-3.

The bis-olefins of formula (I) wherein Z is an alkylene or cycloalkylene radical can be prepared according to what described, for example, by I. L. Knunyants et al. in Izv. Akad. Nauk. SSSR, Ser. Khim., 1964(2), 384-6. The bis-olefins containing (per)fluoropolyoxyalkylene structures are described in U.S. Pat. No. 3,810,874.

More preferably the bis-olefin has formula:

$$CH_2=CH\text{—}(CF_2)_{t0}\text{—}CH=CH_2$$

wherein t0 is an integer from 6 to 10.

The bis-olefin of formula:

$$CH_2=CH\text{—}(CF_2)_6\text{—}CH=CH_2 \qquad (b)$$

is particularly preferred.

The fluoroelastomers of the invention are cured by peroxidic way, therefore they preferably contain iodine in amounts generally between 0.001% and 5% by weight, preferably between 0.01% and 2.5% by weight with respect to the total polymer weight. The iodine atoms can be present in the chain and/or in end position.

To introduce iodine atoms along the chain, the copolymerization of the basic fluoroelastomer monomers is carried out with a suitable fluorinated comonomer containing iodine (cure-site monomers), see for example U.S. Pat. No. 4,745,165, U.S. Pat. No. 4,831,085, U.S. Pat. No. 4,214,060, EP 683,149. The fluorinated comonomer containing iodine can be selected for example from the following compounds:

(ao) iodo(per)fluoroalkyl-perfluorovinylethers of formula:

$$I-R_f-O-CF=CF_2 \quad (III)$$

wherein $R_f$ is a $C_1$-$C_{12}$ (per)fluoroalkylene, optionally containing chlorine and/or ether oxygen atoms;
for example: $ICF_2-O-CF=CF_2$, $ICF_2CF_2-O-CF=CF_2$, $ICF_2CF_2CF-O-CF=CF_2$, $CF_3CFICF_2-O-CF=CF_2$, and the like;

(bo) iodo-(per)fluoroolefins of formula:

$$I-R'_f CF=CF_2 \quad (IV)$$

wherein $R'_f$ is a $C_1$-$C_{12}$ (per)fluoroalkylene, optionally containing chlorine atoms; for example: iodotrifluoroethylene, 1-iodo-2,2-difluoroethylene, iodo-3,3,4,4-tetrafluorobutene-1, 4-iodo-perfluorobutene-1, and the like;

(co) iodo-(per)fluoroolefins of formula:

$$CHR_o=CH-Z_o-CH_2CHRO-I \quad (V)$$

wherein: $R_o$ is H or $-CH_3$; $Z_o$ is a $C_1$-$C_{18}$ linear or branched (per)fluoroalkylene radical, optionally containing one or more oxygen atoms, or a (per)fluoropolyoxyalkylene radical as defined above.

Other cure-site iodinated comonomers are iodofluoroalkylvinylethers, see U.S. Pat. No. 4,745,165 and U.S. Pat. No. 4,564,662.

Alternatively, or in addition to the iodinated comonomer, the fluoroelastomer can contain iodine atoms in end position, deriving from a suitable iodinated chain transfer agent introduced in the reaction medium during the polymer preparation, as described in U.S. Pat. No. 4,501,869. Said transfer agents have formula $R^A_f(I)_x$, wherein $R^A_f$ is a $C_1$-$C_{12}$ (per)fluoroalkyl radical, optionally containing chlorine atoms, while x is 1 or 2. Said transfer agents can be selected, for example, from: $CF_2I_2$, $I(CF_2)_6I$, $I(CF_2)_4O$, $CF_2Cl_1$, $CF_3CFICF_2I$, and the like.

For the introduction of iodine as chain end group by the addition of iodinated chain transfer agents, as above, see for example U.S. Pat. No. 4,243,770 and U.S. Pat. No. 4,943,622.

It is also possible to use as chain transfer agents alkaline or alkaline-earth metal iodides, according to patent EP 407,937.

In association with the chain transfer agents containing iodine, other known chain transfer agents of the prior art can be used, such as ethyl acetate, diethylmalonate, etc.

The iodine amount in end position of the fluoroelastomer is generally between 0.001% and 3%, preferably between 0.01% and 1% by weight with respect to the fluoroelastomer weight. See U.S. Pat. No. 4,035,565 and U.S. Pat. No. 4,694,045.

Furthermore the curable fluoroelastomers can contain, alternatively or in association with iodine, also bromine, in the chain and in end position. The bromine in the chain can be introduced according to known techniques; see for example U.S. Pat. No. 4,035,565, U.S. Pat. No. 4,745,165, EP 199,138; or as end bromine as described in U.S. Pat. No. 4,501,869.

Preferably the fluoroelastomer contains iodine atoms in the chain and/or in end position.

Optionally the fluoroelastomers of the invention comprise in the mixture a semicrystalline (per)fluoropolymer in an amount in percent by weight referred to the total of the dry weight of the mixture fluoroelastomer+semicrystalline (per) fluoro-polymer, from 0% to 70% by weight, preferably from 0% to 50% by weight, still more preferably from 2% to 30% by weight. Semicrystalline (per)fluoropolymer means a (per) fluoropolymer showing, besides the glass transition temperature Tg, at least one crystalline melting temperature.

The semicrystalline (per)fluoropolymer is constituted by tetrafluoroethylene (TFE) homopolymers, or TFE copolymers with one or more monomers containing at least one unsaturation of ethylene type, in an amount from 0.01% to 10% by moles, preferably from 0.05% to 7% by moles.

Said comonomers having an ethylene unsaturation are of hydrogenated and fluorinated type. Among the hydrogenated ones, ethylene, propylene, acrylic monomers, for example methylmethacrylate, (meth)acrylic acid, butylacrylate, hydro-xyethylhexylacrylate, styrene monomers, can be mentioned.

Among fluorinated comonomers it can be mentioned:

$C_3$-$C_8$ perfluoroolefins, such as hexafluoropropene (HFP), hexafluoroisobutene;

$C_2$-$C_8$ hydrogenated fluoroolefins as vinyl fluoride (VF), vinylidene fluoride (VDF), trifluoroethylene, $CH_2=CH-R_f$ perfluoroalkylethylene, wherein $R_f$ is a $C_1$-$C_6$ perfluoroalkyl;

$C_2$-$C_8$ chloro- and/or bromo- and/or iodo-fluoroolefins as chlorotrifluoroethylene (CTFE);

$CF_2=CFORf$ (per)fluoroalkylvinylethers (PAVE), wherein $R_f$ is a $C_1$-$C_6$ (per)-fluoroalkyl, for example $CF_3$, $C_2F_5$, $C_3F_7$;

$CF_2=CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups, for example perfluoro-2-propoxy-propyl; fluorodioxoles, preferably per-fluorodioxoles.

PAVEs, in particular perfluoromethyl-, ethyl-, propylvinylether and fluorodioxoles, preferably perfluorodioxoles, are preferred comonomers.

When the perfluoroelastomers of the present invention contain semicrystalline (per)fluoropolymers, mixing is carried out by mixing in the desired ratios the fluoroelastomer latex with the semicrystalline perfluoropolymer latex and then co-coagulating the obtained mixture as described in U.S. Pat. No. 6,395,834 and U.S. Pat. No. 6,310,142.

Alternatively the semicrystalline (per)fluoropolymer can be polymerized and then the fluoroelastomer is polymerized on the (per)fluoropolymer particles. A core-shell structure is thus obtained.

The Applicant has found that when the —COF end groups in the fluoroelastomer are substantially absent according to the above method, the best combination of mechanical properties and compression set in a wide temperature range, both at high and at low temperatures, is obtained.

Preferred compositions (in % by moles) are the following (the sum of the molar percentages of the monomers being 100%), more preferably the compositions contain a bis-olefin:

monomer of formula (a): 25-50%, preferably 30-45%, still more preferably excluding 40% by moles;
and
VDF: 50-75%, preferably excluding 60% by moles;
monomer of formula (a): 25-50%, preferably 30-45%, still more preferably excluding 40% by moles;
and
VDF: 50-75%, preferably excluding 60% by moles;

and
bis-olefin of formula (b): 0.01-1%;
monomer of formula (a): 25-50%, preferably 30-45%, still more preferably excluding 40% by moles;
and
VDF: 50-75%, preferably excluding 60% by moles;
and
TFE: 2-20%, preferably 5-10%;
and
bis-olefin of formula (b): 0.01-1%;
monomer of formula (a): 25-50%, preferably 30-45%, still more preferably excluding 40% by moles;
and
VDF: 50-75%, preferably excluding 60% by moles;
and
MVE (perfluoromethylvinylether): 2-20%, preferably 5-10%;
and
bis-olefin of formula (b): 0.01-1%;
monomer of formula (a): 25-50%, preferably 30-45%, still more preferably excluding 40% by moles;
and
VDF: 50-75%, preferably excluding 60% by moles;
and
TFE: 0-10%, preferably 3-8%;
and
MVE: 0-10%, preferably 3-8%;
and
bis-olefin of formula (b): 0.01-1%.

As said, the fluoroelastomers of the invention show an improved combination of the above properties.

The fluoroelastomers of the present invention show a good elastic behaviour at low temperatures, as for example shown by the TR10 and TR70 values (ASTM D 1329).

The fluoroelastomers of the present invention containing surprisingly and unexpectedly reduced amounts of comonomer (a) show a Tg lower than −49° C., preferably lower than −50° C., combined with good mechanical and sealing properties. This is surprising and unexpected as it was not foreseeable that with reduced amounts of comonomer (a), quite lower than 75% by moles, it was possible to obtain fluoropolymers having Tg as low as −49° C., preferably lower than −50° C., and having the above advantageous combination of properties. From the industrial point of view this represents a great advantage as reduced amounts of expensive vinylethers are used.

The Applicant has found that the fluoroelastomers of the present invention are obtained with high polymerization kinetics and therefore it is possible to obtain copolymers having a high molecular weight. The fluoroelastomers of the present invention are obtainable with high yields and therefore make useless, at the end of the polymerization, the recovery of the unreacted monomers. This allows to simplify the production plant, the expensive recovery methods of unreacted monomers not being necessary.

The fluoroelastomers are prepared by polymerization of the monomers in aqueous emulsion in the presence of an emulsion, dispersion or microemulsion of perfluoropolyoxyalkylenes, according to U.S. Pat. No. 4,789,717 and U.S. Pat. No. 4,864,006. Preferably the synthesis is carried out in the presence of a perfluoropolyoxyalkylene microemulsion.

According to well known methods of the prior art, radical initiators, for example persulphates, perphosphates, alkaline or ammonium perborates or percarbonates, optionally in combination with ferrous, cuprous or silver salts, or other easily oxidizable metals, are used. In the reaction medium also surfactants of various kind are optionally present, among which fluorinated surfactants of formula:

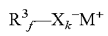

are particularly preferred, wherein $R^3_f$ is a $C_5$-$C_{16}$ (per)fluoroalkyl chain or (per)fluoropolyoxyalkyl chain, $X_k^-$ is —COO$^-$ or —SO$_3^-$, $M^+$ is selected from: $H^+$, $NH_4^+$, or an alkaline metal ion. Among the most commonly used we remember: ammonium perfluorooctanoate, (per)fluoropolyoxyalkylenes ended with one or more carboxylic groups, etc. See U.S. Pat. No. 4,990,283 and U.S. Pat. No. 4,864,006.

The polymerization reaction is generally carried out at temperatures between 25° C. and 150° C., at a pressure between the atmospheric one up to 10 MPa.

In alternative or in association with the chain transfer agents containing iodine and/or bromine, other known chain transfer agents of the prior art as ethyl acetate, diethyl-malonate, ethane, etc., can be used.

As said, the fluoroelastomers of the present invention are cured by peroxidic way. In the peroxidic curing, preferably the fluoroelastomer contains in the chain and/or in end position to the macromolecule iodine and/or bromine atoms.

To the curing blend the following compounds are added:
peroxides capable to generate radicals by heating, for example: dialkylperoxides, in particular di-terbutyl-peroxide and 2,5-dimethyl-2,5-di(terbutylperoxy)hexane; dialkylarylperoxides as, for example, dicumyl peroxide; dibenzoyl peroxide; diterbutyl perbenzoate; di[1,3-dimethyl-3-(terbutylperoxy)butyl]-carbonate. Other peroxidic systems are described, for example, in patents EP 136,596 and EP 410,351.

The peroxide amount is generally from 0.5% to 10% by weight with respect to the polymer, preferably 0.6%-4% by weight;

curing coagents, in amounts generally between 0.5 and 10%, preferably between 1 and 7%, by weight with respect to the polymer; among them, bis-olefins of formula (I); triallyl-cyanurate, triallyl-isocyanurate (TAIC), tris-(diallylamine)-s-triazine; triallylphosphite; N,N-diallyl-acrylamide; N,N,N',N'-tetraallyl-malonamide; tri-vinyl-isocyanurate; 4,6-tri-vinyl-methyl-trisiloxane, etc., are commonly used: TAIC and the bis-olefin of formula:

$$CH_2=CH-(CH_2)_6-CH=CH_2$$

are particularly preferred;

optionally
a metal compound, in amounts between 1 and 15%, preferably from 2 to 10% by weight with respect to the polymer, selected from divalent metal oxides or hydroxides as, for example, Mg, Zn, Ca or Pb, optionally associated to a weak acid salt as stearates, benzoates, carbonates, oxalates or phosphites of Ba, Na, K, Pb, Ca;

other conventional additives as mineral fillers, semicrystalline fluoropolymers in powder, pigments, anti-oxidants, stabilizers and the like.

The semicrystalline (per)fluoropolymers, optional components of the present invention, are prepared according to the emulsion or microemulsion polymerization methods described above for the fluoroelastomers of the invention.

The monomer of formula (a) $CF_3OCF_2OCF=CF_2$ can be prepared by the following process:

I reaction in liquid phase of the fluoroformate $CF_3OCOF$ with elemental fluorine and olefinic compounds having formula:

$$CAF=CA'F \hspace{5em} (IV)$$

to obtain the fluorohalogenether of formula:

$$CF_3OCF_2OCFACF_2A' \quad (V)$$

wherein A and A', equal to or different the one from the other, are H, Cl or Br, with the proviso that they are not both H; the temperature ranging from −120° C. to −20° C., preferably from −100° C. to −40° C., optionally one operates in the presence of a perhalogenated solvent, liquid and inert under the reaction conditions, optionally the fluorine is diluted with an inert gas, for example, nitrogen or helium, II dehalogenation, when A and A' are both halogen, or dehydrohalogenation, when one of A or A' is hydrogen and the other is halogen of compound (V).

The dehalogenation or dehydrohalogenation reactions used are well known in the prior art. The molar ratio $CF_3OF/CO$ is between 0.1 and 10, preferably between 0.2 and 5, more preferably between 0.5 and 2. The optional perhalogenated solvent used in the fluorination of the fluoroformate step I is preferably an organic compound containing fluorine and/or chlorine, optionally one or more oxygen atoms in the chain and/or aminic groups at the ends thereof. When the perhalogenated solvent is perfluorinated, it can, for example, be selected among perfluorocarbons, perfluoroethers, perfluoropolyethers, perfluoroamines, or respective mixtures.

The fluoroformate $CF_3OCOF$ can be prepared with high conversion and selectivity by thermal reaction in gaseous phase of $CF_3OF$ (fluoroxyperfluoromethane) and CO by feeding the reactants in a reactor maintained at temperatures between 80° C. and 250° C., preferably between 120° C. and 230° C., still more preferably between 150° C. and 200° C.

The reaction mixture containing $CF_3OCOF$ can directly be fed, without separation of the mixture components, in the reactor of step 1. In this way the whole process results particularly simple and effective. As said, the $CF_3OF$ conversion and the selectivity to $CF_3OCOF$ are high (see the Examples).

In the described process for preparing $CF_3OCOF$ by increasing the reaction temperature in the range 80° C.-250° C., the conversion increases but a high selectivity is substantially maintained.

Another process for preparing $CF_3OCOF$ is by photochemical route in liquid phase in the presence of ultraviolet radiations at temperatures between 0° C. and 100° C., preferably between 20° C. and 50° C., by feeding the two reactants into a reactor equipped with a mercury high pressure UV lamp, contained in a cooled quartz sheath, immersed in the reaction mixture. The Applicant has found that the process has a high selectivity. Further higher yields are obtained compared with the reaction carried out in gaseous phase. This process is carried out in the presence of an inert perfluorinated solvent and at the liquid state under the reaction conditions, preferably selected from perfluorocarbons, perfluoropolyethers, perfluorinated tertiary amines, fluorochlorocarbons, or mixtures thereof.

In the process for preparing $CF_3OCOF$ when the $CF_3OF$ conversion is not quantitative, the gaseous flow coming out from the reactor contains a mixture formed of the reaction product together with unconverted reactants. $CF_3OF$ can be removed by passing the gaseous flow into a cold trap containing a fluorinated olefin, for example $CFCl=CFCl$. The latter reacts with $CF_3OF$ forming a fluorohalogenether; then, by fractional distillation, $CF_3OCOF$ is separated and it is available for step 1.

Alternatively the gaseous flow coming out from the reactor can be cooled down to condensate the fluoroformate $CF_3OCOF$, thus separating $CF_3OF$ and CO and their recycle into the reactor by keeping the $CF_3OF/CO$ ratio in the above limits.

Preferably $CF_3OCOF$ is prepared by reacting the fluorooxyperfluoromethane and carbon monoxide at temperatures from 80° C. to 250° C.

The reactor, where $CF_3OCOF$ is prepared, is preferably made of glass, inert perfluorinated plastics as for example PTFE, PFA, metal alloys, for example AISI 316, preferably coated, where the reaction takes place, with glass or perfluorinated plastics. More preferably glass or fluorinated plastics are used.

The fluoroelastomers of the present invention, as said, show an improved combination, at high temperatures, of mechanical properties, in particular modulus, stress at break and elongation at break, of elastomeric properties as shown by the compression set, and of thermal resistance, and contemporaneously an improved combination of the above properties also at low temperatures, as indicated by the Tg values lower than −49° C., preferably lower than or equal to −50° C.

Manufactured articles usable from Tg values lower than −49° C. up to 250° C. having improved mechanical and elastomeric properties can be obtained from the fluoroelastomer of the invention.

A further object of the present invention are curable fluoroelastomers having Tg lower than −49° C., preferably lower than or equal to −50° C., wherein vinylether (a1) MOVE 2 having formula:

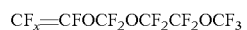

$$CF_2=CFOCF_2OCF_2CF_2OCF_3$$

is used instead of monomer a). Move 2 is used in amounts from 18 to 35% by moles, the vinylidene fluoride (VDF) ranges from 50% to 75% by moles, the complement to 100% being the sum of the molar percentages of the monomers.

A further object of the present invention are curable fluoroelastomers having a Tg lower than −49° C., preferably lower than or equal to −50° C., comprising (in percent by moles):

monomer a) from 2 to 50%, more preferably from 10 to 30%;

vinylether (a1) MOVE 2 from 2 to 35%, preferably from 10 to 20%; comonomers B), wherein the vinylidene fluoride (VDF) is in amounts from 50% to 75% on the total of the monomer moles, being the complement to 100% of the monomer molar percentage.

When the fluoroelastomers contain MOVE 2, the amount of —COF end groups is higher than 0.05 mmoles/Kg depending on the amount of MOVE 2.

The curable fluoroelastomers containing MOVE 2 preferably contain a bis-olefin of formula (I) as defined. Furthermore the fluoroelastomers contain iodine in amounts as defined above for the fluoroelastomers containing as vinylether only monomer (a). The iodine atoms can be in the polymer backbone and/or as terminal end. Besides, alternatively or in association with the iodine, bromine in the chain and in end position can be present, in the backbone and/or as terminal end.

Furthermore the curable fluoroelastomers can be mixed with a semicrystalline (per)fluoropolymer as said for the curable fluoroelastomer containing as vinylether only the monomer (a).

A further object of the present invention are cured fluoroelastomers obtainable from curable fluoroelastomers.

The following Examples illustrate with non limitative purposes the present invention.

EXAMPLES

Analytical Methods

Determination of the Polymer Tg

The Tg has been determined by DSC analysis according to the ASTM D 3418 method. The Tg values reported in the Examples are the mid-point Tg.

Determination of the —COF Polar End Groups

At the end of the polymerization of the monomer the polymer is isolated through coagulation by freezing at $-20°$ C. and subsequent defrosting at room temperature until obtaining a slurry wherein the polymer deposits on the bottom; then the polymer is washed twice with demineralized water and dried in stove at 90° C. until a constant weight (about 12 hours); the —COF end polymer groups are determined by FT-IR spectroscopy by using the Nicolet® Nexus FT-IR equipment (256 scannings, resolution 2 $cm^{-1}$) on a polymer film having a thickness from 50 to 300 micron by initially scanning between 4000 $cm^{-1}$ and 400 $cm^{-1}$ to obtain the initial spectrum keeping the film for 12 hours in an environment saturated with ammonia vapours, and then recording the IR final spectrum under the same conditions of the initial IR spectrum; subtraction from the initial spectrum the final spectrum to obtain the "difference spectrum" which is normalized by the following equation:

$$\frac{\text{"Difference spectrum"}}{[\text{film weight (g)/film area } (cm^2)]};$$

then the optical densities related to the —COF end groups which have reacted with the ammonia vapours are measured, —COF end groups with this reactant give rise to detectable peaks; the optical densities are converted into mmoles/kg of polymer using the molar extinction coefficient of the —COF group at 1884 $cm^{-1}$, equal to 215 liters/(moles×cm), as reported in Table 1, page 73 of the publication by M. Pianca et Al. "End groups in fluoropolymers", J. Fluorine Chem. 95 (1999), 71-84 (herein incorporated by reference); the found values express the concentrations of the residual —COF end groups as mmoles of end groups —COF/Kg of polymer: in the fluoroelastomer spectrum of the invention no bands related to —COF end groups (1900-1830 $cm^{-1}$) are detectable, the method sensitivity limit being 0.05 mmoles/Kg.

Example A

Preparation of $CF_3OCOF$ by Thermal Reaction at 170° C. in Glass Reactor

A tubular glass reactor is used having an inner diameter of 55.6 mm and length of 510 mm, filled with 6×6 glass Raschig rings (free internal volume 842 ml), maintained thermostated by electric resistances.

In the reactor, maintained at the temperature of 170° C., a gaseous flow of $CF_3OF$ (1.5 liters/hour), synthesized as described in U.S. Pat. No. 4,400,872 and, contemporaneously, a CO flow (1.5 liters/hour), are fed for 5 hours. The flow coming out from the reactor is continuously analyzed by in line gaschromatographic analysis.

The flow is then condensed, except CO, in a trap maintained at $-110°$ C. containing 15 g of CFCl=CFCl (A 1112), so that the residual $CF_3OF$ reacts with the olefin to give $CF_3OCFClCF_2Cl$.

After fractional distillation of the resulting mixture, 33.9 g of $CF_3OCOF$ pure at 99.8% (molar yield on the fed $CF_3OF$ 76.5%); 12.3 g of $CF_3OCFClCF_2Cl$; 3.4 g of $COF_2$ are obtained.

The conversion is 84.5% and the selectivity 90%, calculated on the fed $CF_3OF$

Example B

Preparation of $CF_3OCOF$ by Thermal Reaction at 170° C. in PTFE Reactor

A PTFE tubular thermostated reactor is used, having an internal diameter of 4 mm and length of 13.2 m.

A gaseous flow of $CF_3OF$ (1.5 liters/hour) and, contemporaneously, a flow of CO (2.0 liters/hour) are fed in the reactor, maintained at the temperature of 170° C.

The flow coming out from the reactor, analyzed by gaschromatography, has the following molar composition: 7.3% $CF_3OF$, 54.2% $CF_3OCOF$, 9.1% $COF_2$ and 29.4% CO.

Example C

Preparation of $CF_3OCOF$ by Thermal Reaction at 120° C. in PTFE Reactor

A gaseous flow of $CF_3OF$ (1.5 liters/hour) and, contemporaneously, a flow of CO (2.0 liters/hour) are fed for 6 hours in the same reactor used in the Example B, maintained at the temperature of 120° C. The flow coming out from the reactor is analyzed by gaschromatography and has the following molar composition, leaving out CO in excess: 86.7% $CF_3OF$, 13.3% $CF_3OCOF$.

The flow is then condensed, except CO, in a trap maintained at $-110°$ C. containing 50 g of A 1112, so that the residual $CF_3OF$ reacts with the olefin.

After fractional distillation of the resulting mixture, 6.8 g of $CF_3OCOF$ pure at 99% are obtained.

The selectivity is 98%, calculated on the converted $CF_3OF$ The conversion is 13.0%.

Example D

Preparation of $CF_3OCOF$ by Thermal Reaction at 170° C. in AISI 316 Reactor

An AISI 316 tubular thermostated reactor is used, having an internal diameter of 4 mm and length of 11.3 m.

A gaseous flow of $CF_3OF$ (1.5 liters/hour) and, contemporaneously, a flow of CO (1.5 liters/hour) are fed for 6 hours in the reactor, maintained at the temperature of 170° C. The gaseous flow coming out from the reactor is condensed in a trap maintained at $-110°$ C. containing 30 g of A 1112.

After fractional distillation of the trap content, 31.2 g of $CF_3OCOF$ pure at 99%, 31.8 g of fluorohalogenether and 3.7 g of $COF_2$ are obtained. The conversion is 66.6% and the selectivity is 86.5%.

Example E

Preparation of $CF_3OCOF$ by Photochemical Reaction 500 g of a perfluoropolyether Galden®LS-165 are fed to a 300 ml cylindrical glass reactor, equipped with stirrer and UV lamp Hanau TQ 150, with 150 W power and optical route 1 cm. Then 2.0 liters/hour of CF$_3$OF diluted with 3.0 liters/hour of He, and 2.0 liters/hour of CO are fed contemporaneously for 5 hours.

The gases coming out from the reactor are condensed in a trap maintained at −110° C. containing 30 g of A 1112. After fractional distillation of the condensed mixture, 22.9 g of CF$_3$OCOF pure at 99%, 41.8 g of fluorohalogenether CF$_3$OCFClCF$_2$—Cl, 5.8 g of COF$_2$, 5.4 g of trifluoromethyl carbonate are obtained.

The CF$_3$OF conversion is 60.5%. The selectivity is 63.6%.

Example F

Obtainment of the Monomer of Formula (a) by Reaction of CF$_3$OCOF with Elemental Fluorine and a Fluoroolefin of Formula CFCl=CFCl and Subsequent Dehalogenation of the Fluorohalogenether 20 g of CFCl=CFCl (A 1112), 30 g of CF$_3$OCOF obtained as in the Example A are transferred in a 50 ml glass reactor. The formed solution is maintained at −100° C. and fluorine diluted with nitrogen is bubbled at a flow rate of 1 liter/hour.

The mass balance at the end of the reaction is 92%, the $^{19}$F-NMR analysis on the reaction raw product (52 g) shows that the fluoroformate conversion is 54% and the selectivity to give the fluorohalogenether CF$_3$OCF$_2$OCFClCF$_2$Cl is 93%. The unreacted fluoroformate is removed from the reaction raw product by adding water, under stirring. It is allowed to reach 25° C., the organic phase is recovered and dried over MgSO$_4$. The mixture is filtered and the obtained residue is distilled and the fraction of 31.8 g boiling at 74° C. corresponding to the fluorohalogenether pure at 99% is recovered.

The fluorohalogenether dehalogenation is carried out by using an 1 liter flask equipped with mechanical stirrer, thermometer, dropping funnel, distillation column and trap at −78° C. 450 ml of dimethylformamide (DMF), 62 g of zinc in powder and 8.3 g of ZnCl$_2$ are fed into the flask. The temperature in the suspension is brought to 80° C. and 150 g of the fluorohalogenether isolated in the previous reaction are added. When the addition is over, the mixture is allowed to react for one hour. At the end the temperature is gradually increased up to 120° C. and it is still allowed to react for one hour. At the end it is disconnected and 106 g of the monomer of formula (a) CF$_3$OCF$_2$OCF=CF$_2$ pure at 99% (boiling point 23° C.) are recovered therefrom.

Example 1

Preparation of the Microemulsion

One liter of microemulsion is prepared by mixing the following ingredients in the amounts indicated hereinafter:

220.7 ml of a perfluoropolyoxyalkylene having one acid end group with number average molecular weight 600 of formula:

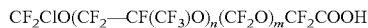

wherein n/m=10;
220.7 ml of an aqueous solution of NH$_3$ at 30% by volume;
427.6 ml of demineralized water;
131 ml of Galden® D02, having number average molecular weight 450 of formula:

wherein n/m=20.

Example 2

Copolymer VDF/Monomer (a) 70/30% by Moles 3.5 liters of demineralized water and 35 ml of a microemulsion obtained as described in the Example 1 were introduced, after air removal in a 5 liter autoclave, equipped with stirrer working at 630 rpm.

The inside of the autoclave was heated to 70° C. and maintained at this temperature for the whole reaction. Then 64 g of CF$_2$=CFOCF$_2$OCF$_3$ (monomer (a)) and 3.29 g of 1,4-diiodoperfluorobutane (C$_4$F$_8$I$_2$) were introduced in the autoclave.

The inside of the autoclave is then pressurized at 10 bar (1 MPa) with VDF.

Then in the autoclave are introduced:
0.35 g of ammonium persulphate (APS) as initiator;
1.51 g of bis-olefin of formula CH$_2$=CH—(CF$_2$)$_6$—CH=CH$_2$;
the addition of the compound was carried out for a total of 20 portions, each of 0.076 g, starting from the beginning of the polymerization and for every 5% increase in the monomer conversion;
228 g of CF$_2$=CF—O—CF$_2$—O—CF$_3$ (monomer (a));
the addition of the compound was carried out for a total of 19 portions each of 12 g, starting from the time when a conversion of the monomers equal to 5% takes place and continuing at every 5% increase in the monomer conversion.

The pressure of 10 bar (1 MPa) is maintained constant for the whole polymerization by feeding pure VDF.

After 196 minutes of reaction, corresponding to 100% of monomer conversion, the autoclave is cooled and the latex discharged.

The latex is coagulated with an ammonium sulphate solution (6 grams of Al$_2$(SO$_4$)$_3$ for each liter of latex) and dried at 90° C. in an air circulated stove for 24 hours. 409 g of polymer are obtained.

The amount of reacted monomer with respect to that fed results to be 84.9%.

By $^{19}$F-NMR analysis of the polymer hot dissolved in acetone, the molar percentage of the monomer (a) in the polymer, equal to 29.8%, is determined.

The T$_g$ determined by DSC is −51.1° C.

The Mooney viscosity (ML(1+10'@121° C.)) measured according to the ASTM D 1646 method is 3 MU.

The obtained polymer is mixed in roll open mixer with the crosslinking additives in ratios in phr as indicated in the Table 1. The mechanical properties, compression set, TR 10 and TR 70 are reported in Table 1.

Example 3

Copolymer VDF/Monomer (a) 52/48% by Moles 3.5 liters of demineralized water and 35 ml of a microemulsion obtained as described in the Example 1 were introduced, after air removal, in a 5 liter autoclave equipped with stirrer working at 630 rpm.

The inside of the autoclave was heated to 70° C. and maintained at this temperature for the whole reaction. Then 230 g of CF$_2$=CFOCF$_2$OCF$_3$ (monomer (a)) and 5.68 g of 1,4-diiodoperfluorobutane (C$_4$F$_8$I$_2$) were introduced in the autoclave.

The inside of the autoclave is then pressurized at 9 bar (0.9 MPa) with VDF.

Then in the autoclave are introduced:

0.35 g of ammonium persulphate (APS) as initiator;

2.43 g of bis-olefin of formula $CH_2=CH-(CF_2)_6-CH=CH_2$;

the addition of the compound was carried out for a total of 20 portions, each of 0.121 g, starting from the beginning of the polymerization and for every 5% increase in the monomer conversion;

684 g of $CF_2=CF-O-CF_2-O-CF_3$ (monomer (a));

the addition of the compound is carried out for a total of 19 portions, each of 36 g, starting from the time when a conversion of the monomers equal to 5% takes place and continuing at every 5% increase in the monomer conversion.

The pressure of 9 bar (0.9 MPa) is maintained constant for the whole polymerization by feeding pure VDF.

After 219 minutes of reaction, corresponding to 100% of monomer conversion, the autoclave is cooled and the latex discharged.

The latex is coagulated and the obtained powder dried as described in the Example 2.

794 g of polymer are obtained.

By $^{19}F$-NMR analysis of the polymer hot dissolved in acetone, the molar percentage of the monomer (a) in the polymer, equal to 48.2%, is determined.

The $T_g$ determined by DSC is $-54.1°$ C.

The Mooney viscosity (ML(1+10'@121° C.)) measured according to the ASTM D 1646 method is 3 MU.

The obtained polymer is mixed in roll open mixer with the crosslinking additives in ratios in phr as indicated in Table 1. The mechanical properties, compression set, TR 10 and TR 70 are reported in Table 1.

Example 4

Terpolymer VDF/TFE/Monomer (a) 68/6/26% by Moles 3.5 liters of demineralized water and 35 ml of a microemulsion obtained as described in the Example 1 were introduced, after air removal, in a 5 liter autoclave equipped with stirrer working at 630 rpm.

The inside of the autoclave was heated to 70° C. and maintained at this temperature for the whole reaction. Then 52 g of $CF_2=CFOCF_2OCF_3$ (monomer (a)) and 3.29 g of 1,4-diiodoperfluorobutane ($C_4F_8I_2$) were introduced in the autoclave.

The inside of the autoclave is then pressurized at 10 bar (1 MPa) with the following mixture of monomers, the composition being % by moles: VDF 91.5%, TFE 8.5%.

Then in the autoclave are introduced:

0.35 g of ammonium persulphate (APS) as initiator;

1.51 g of bis-olefin of formula $CH_2=CH-(CF_2)_6-CH=CH_2$;

the addition of the compound was carried out for a total of 20 portions, each of 0.076 g, starting from the beginning of the polymerization and for every 5% increase in the monomer conversion;

228 g of $CF_2=CF-O-CF_2-O-CF_3$ (monomer (a));

the addition of the compound was carried out for a total of 19 portions, each of 12 g, starting from the time when a conversion of the monomers equal to 5% takes place and continuing at every 5% increase in the monomer conversion.

The pressure of 10 bar (1 MPa) is maintained constant for the whole polymerization by feeding the monomer mixture having the following composition in percent by moles: VDF 90%, TFE 10%.

After 91 minutes of reaction, corresponding to 100% of monomer conversion, the autoclave is cooled and the latex discharged.

The latex is coagulated and the obtained powder dried as described in the Example 2.

421 g of polymer are obtained.

The amount of reacted monomer with respect to the fed one results to be 81.7%.

By $^{19}F$-NMR analysis of the polymer hot dissolved in acetone, the molar percentages in the polymer respectively of the monomer (a) equal to 25.6%, of VDF equal to 68.1% and of TFE equal to 6.3%, are determined.

The $T_g$ determined by DSC is $-49.2°$ C.

The Mooney viscosity (ML(1+10'@121° C.)) measured according to the ASTM D 1646 method is 7 MU.

By IR analysis it is found that the —COF end groups in the polymer are lower than the method sensitivity limit.

The obtained polymer is mixed in a roll open mixer with the crosslinking additives in ratios in phr as indicated in Table 1. The mechanical properties, compression set, TR 10 and TR 70 are reported in Table 1.

Example 5

Terpolymer VDF/Monomer (a)/Monomer (a1) 72/18/10% by Moles 3.5 liters of demineralized water and 35 ml of a microemulsion obtained as described in the Example 1 were introduced, after air removal, in a 5 liter autoclave equipped with stirrer working at 630 rpm.

The inside of the autoclave was heated to 70° C. and maintained at this temperature for the whole reaction. Then 88 g of $CF_2=CFOCF_2OCF_3$ (monomer (a)), 146 g of $CF_2=CFOCF_2OCF_2CF_2OCF_3$ (monomer (a1)), 3.79 g of 1,4-diiodoperfluorobutane ($C_4F_8I_2$) were introduced in the autoclave.

The autoclave inside is then pressurized at 10 bar (1 MPa) with VDF.

Then in the autoclave are introduced:

0.35 g of ammonium persulphate (APS) as initiator;

1.51 g of bis-olefin of formula $CH_2=CH-(CF_2)_6-CH=CH_2$;

the addition of the compound was carried out for a total of 20 portions, each of 0.076 g, starting from the beginning of the polymerization and for every 5% increase in the monomer conversion;

152 g of $CF_2=CF-O-CF_2-O-CF_3$ (monomer (a));

the addition of the compound was carried out for a total of 19 portions, each of 8 g, starting from the time when a conversion of the monomers equal to 5% takes place and continuing at every 5% increase in the monomer conversion.

218.5 g of $CF_2=CFOCF_2OCF_2CF_2OCF_3$ (monomer (a1));

the addition of the compound was carried out for a total of 19 portions each of 11.5 g, starting from the time when a conversion of the monomers equal to 5% takes place and continuing at every 5% increase in the monomer conversion.

The pressure of 10 bar (1 MPa) is maintained constant for the whole polymerization by feeding pure VDF.

After 65 minutes of reaction, corresponding to 100% of monomer conversion, the autoclave is cooled and the latex discharged.

The latex is coagulated and the obtained powder dried as described in the Example 2.

583 g of polymer are obtained.

By $^{19}$F-NMR analysis of the polymer hot dissolved in acetone, the molar percentages in the polymer respectively of the monomer (a) equal to 17.6%, of VDF equal to 71.8% and of monomer (a1) equal to 10.6%, are determined.

The $T_g$ determined by DSC is $-53.7°$ C.

The Mooney viscosity (ML(1+10'@121° C.)) measured according to the ASTM D 1646 method is 3 MU.

The obtained polymer is mixed in a roll open mixer with the crosslinking additives in ratios in phr as indicated in Table 1. The mechanical properties, compression set, TR 10 and TR 70 are reported in Table 1.

Example 6

Copolymer VDF/Monomer (a1) 73/27% by Moles 2.8 liters of demineralized water and 70 g of perfluoropolyoxyalkylene potassium salified having number average molecular weight 600 and formula:

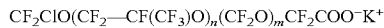

$CF_2ClO(CF_2—CF(CF_3)O)_n(CF_2O)_mCF_2COO^-K^+$ wherein n/m=10, were introduced, after air removal, in a 5 liter autoclave, equipped with stirrer working at 700 rpm.

The inside of the autoclave was heated to 60° C. and maintained at this temperature for the whole duration of the reaction. Then 820 g of $CF_2$=$CFOCF_2O$—$CF_2CF_2OCF_3$ (monomer (a1)), 2.05 g of 1,4-diiodoperfluorobutane ($C_4F_8I_2$) were introduced in the autoclave.

The inside of the autoclave is then pressurized at 20 bar (2 MPa) with VDF.

Then in the autoclave are introduced:

2.7 g of potassium persulphate (KPS) as initiator;

0.76 g of bis-olefin of formula $CH_2$=$CH$—$(CF_2)_6$—$CH$=$CH_2$;

the addition of the compound was carried out for a total of 20 portions, each of 0.038 g, starting from the beginning of the polymerization and for every 5% increase in the monomer conversion.

The pressure of 20 bar (2 MPa) is maintained constant for the whole polymerization by feeding pure VDF.

After 601 minutes of reaction, corresponding to 100% of monomer conversion, the autoclave is cooled and the latex discharged.

The latex is coagulated and the obtained powder dried as described in the Example 2.

532 g of polymer are obtained.

By $^{19}$F-NMR analysis of the polymer hot dissolved in acetone, the molar percentages in the polymer respectively of VDF, equal to 73.0% and of monomer (a1) equal to 27.0, are determined.

The $T_g$ determined by DSC is $-56.6°$ C.

The Mooney viscosity (ML(1+10'@121° C.)) measured according to the ASTM D1646 method is 8 MU.

The obtained polymer is mixed in roll open mixer with the crosslinking additives in ratios in phr as indicated in Table 1. The mechanical properties, compression set, TR 10 and TR 70 are reported in Table 1.

Example 7

Comparative

Copolymer VDF/$CF_2$=$CFOCF_2OCF_2CF_3$ (MOVE 1) 78/22% by Moles 3.0 liters of demineralized water and 30 ml of a microemulsion obtained as described in the Example 1 were introduced, after air removal, in a 5 liter autoclave, equipped with stirrer working at 630 rpm.

The inside of the autoclave was heated to 80° C. and maintained at this temperature for the whole reaction. Then 190 g of $CF_2$=$CFOCF_2OCF_2CF_3$ (MOVE 1), 3.79 g of 1,4-diiodoperfluorobutane ($C_4F_8I_2$) were introduced in the autoclave.

The inside of the autoclave is then pressurized at 15 bar (1.5 MPa) with VDF.

Then in the autoclave are introduced:

0.15 g of ammonium persulphate (APS) as initiator;

2.37 g of bis-olefin of formula $CH_2$=$CH$—$(CF_2)_6$—$CH$=$CH_2$;

the addition of the compound was carried out for a total of 20 portions, each of 0.119 g, starting from the beginning of the polymerization and for every 5% increase in the monomer conversion;

589 g of $CF_2$=$CFOCF_2OCF_2CF_3$ (MOVE 1);

the addition of the compound was carried out for a total of 19 portions, each of 31 g, starting from the time when a monomer conversion equal to 5% takes place and continuing for every 5% increase in the monomer conversion.

The pressure of 15 bar (1.5 MPa) is maintained constant for the whole polymerization by feeding pure VDF.

After 182 minutes of reaction, corresponding to 100% of monomer conversion, the autoclave is cooled and the latex discharged.

The latex is coagulated and the obtained powder dried as described in the Example 2.

880 g of polymer are obtained.

By $^{19}$F-NMR analysis of the polymer hot dissolved in acetone, the molar percentage in the polymer of MOVE 1 equal to 22.4% is determined. Therefore the molar percentage of VDF is equal to 77.6%.

The $T_g$ determined by DSC is $-44.2°$ C.

The Mooney viscosity (ML(1+10'@121° C.)) measured according to the ASTM D 1646 method is 5 MU.

By IR analysis it is found that the —COF end groups in the polymer are higher than 0.05 mmoles/kg.

The obtained polymer is mixed in a roll open mixer with the crosslinking additives in ratios in phr as indicated in Table 1. The mechanical properties, compression set, TR 10 and TR 70 are reported in Table 1.

Example 8

Comparative

Copolymer VDF/$CF_2$=$CFOCF_2OCF_2CF_3$ (MOVE 1) 65/35% by Moles 2.8 liters of demineralized water and 70 g of perfluoropolyoxyalkylene potassium salified having number average molecular weight 600 and formula:

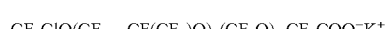

$CF_2ClO(CF_2—CF(CF_3)O)_n(CF_2O)_mCF_2COO^-K^+$ wherein n/m=10, were introduced, after air removal, in a 5 liter autoclave, equipped with stirrer working at 750 rpm.

The inside of the autoclave was heated to 55° C. and maintained at this temperature for the whole duration of the reaction. Then 1030 g of $CF_2$=$CFOCF_2OCF_2CF_3$ (MOVE 1), 2.05 g of 1,4-diiodoperfluorobutane ($C_4F_8I_2$) were introduced in the autoclave.

The inside of the autoclave is then pressurized at 15 bar (1.5 MPa) with VDF.

Then in the autoclave are introduced:
2.4 g of ammonium persulphate (APS) as initiator;
0.76 g of bis-olefin of formula $CH_2$=$CH$—$(CF_2)_6$—$CH$=$CH_2$;
the addition of the compound was carried out for a total of 20 portions, each of 0.038 g, starting from the beginning of the polymerization and for every 5% increase in the monomer conversion.

The pressure of 15 bar (1.5 MPa) is maintained constant for the whole polymerization by feeding pure VDF.

After 108 minutes of reaction, corresponding to 100% of monomer conversion, the autoclave is cooled and the latex discharged.

The latex is coagulated and the obtained powder dried as described in the Example 2.

703 g of polymer are obtained.

By $^{19}$F-NMR analysis of the polymer hot dissolved in acetone, the molar percentage in the polymer of MOVE 1 equal to 35.4% is determined. Therefore the molar percentage of VDF is equal to 64.6%.

The $T_g$ determined by DSC is −46.3° C.

The Mooney viscosity (ML(1+10'@121° C.)) measured according to the ASTM D1646 method is 11 MU.

The obtained polymer is mixed in roll open mixer with the crosslinking additives in ratios in phr as indicated in Table 1. The mechanical properties, compression set, TR 10 and TR 70 are reported in Table 1.

The invention claimed is:

1. VDF curable fluoroelastomers, having a glass transition temperature lower than −49° C. with the following composition (in percent by moles):

A) from 25% to 50% of a monomer of formula:

$$CF_2\!\!=\!\!CFOCF_2OCF_3 \quad (a);\text{ and}$$

B) one or more (per)fluorinated comonomers having at least one ethylene type unsaturation, in amounts from 75% to 50%;

said comonomers comprising vinylidene fluoride (VDF) in amounts from 50% to 75% on the total of the monomer moles;

the sum of the molar percentages of the monomers being 100%;

the fluoroelastomers having an amount of —COF end polymer groups lower than 0.05 mmoles/Kg.

2. Curable fluoroelastomers according to claim 1, wherein comonomers B) different from VDF are selected from the following:

$C_2$-$C_8$ perfluoroolefins;

perfluoroalkylvinylethers of formula $CF_2$=$CFORf$ wherein Rf is a $C_1$-$C_2$ perfluoroalkyl.

3. Curable fluoroelastomers according to claim 2, wherein comonomers B) different from VDF are tetrafluoroethylene (TFE) and for perfluoromethylvinylether (MVE).

4. Curable fluoroelastomers according to claim 1, comprising units deriving from bis-olefins of general formula:

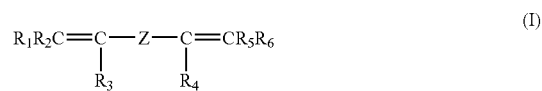

TABLE 1

|  |  | Examples | | | | | | |
|---|---|---|---|---|---|---|---|---|
|  |  | 2 | 3 | 4 | 5 | 6 | 7 Comp | 8 comp |
| Formulation: | | | | | | | | |
| Luperco 101 XL 45 | phr | 2 | 2 | 2 | 2 | 2 | 1.5 | 1.5 |
| Drimix TAIC 75% | " | 5 | 5 | 5 | 5 | 3 | 2 | 2 |
| ZnO | " | 5 | 5 | 5 | 5 | 5 | 5 | 5 |
| Black MT N990 |  | 30 | 30 | 30 | 30 | 30 | 30 | 30 |
| Mooney polymer $ML_{121°\,(1+10)}$ |  | 3 | 3 | 7 | 3 | 8 | 5 | 11 |
| Mechanical properties after post-cure at 230° C. for 1 + 4 h (ASTM D 412-83) | | | | | | | | |
| M100 | Mpa | 5.6 | 3.7 | 4.2 | 3.0 | 1.5 | 1.5 | 1.2 |
| Stress at break | " | 9.4 | 7.5 | 11.7 | 8.0 | 6.3 | 9.6 | 6.4 |
| elongat. at break | % | 145 | 180 | 192 | 190 | 268 | 273 | 316 |
| Shore A hardness |  | 60 | 54 | 63 | 56 | 48 | 50 | 48 |
| Compression set 200° C. for 70 h | | | | | | | | |
| O-ring (ASTM D 395) | % | 29 | 29 | 25 | 29 | 43 | 32 | 47 |
| TR 10 (ASTM D 1329) | ° C. | −50 | −53 | −48 | −53 | −53 | −43 | −45 |
| TR 70 (ASTM D 1329) | ° C. | −41 | −38 | −40 | −41 | −35 | −29 | −34 | wherein:
$R_1, R_2, R_3, R_4, R_5, R_6$, equal to or different from each other, are H or $C_1$-$C_5$ alkyls;
Z is a $C_1$-$C_{18}$ linear or branched alkylene or cycloalkylene radical, optionally containing oxygen atoms, or a (per) fluoropolyoxyalkylene radical.

5. Curable fluoroelastomers according to claim 4, wherein the unit amount in the polymer backbone deriving from the bis-olefins of formula (I) is from 0.01 to 1.0 by moles per 100 moles of the monomeric units constituting the basic perfluoroelastomer structure, the monomer total sum being 100%.

6. Curable fluoroelastomers according to claim 4, wherein in the formula (I) Z is a $C_4$-$C_{12}$ perfluoroalkylene radical, and $R_1, R_2, R_3, R_4, R_5, R_6$ are hydrogen; when Z is a (per)fluoropolyoxyalkylene radical, it comprises units selected from the following:
—$CF_2CF_2O$—, —$CF_2CF(CF_3)O$—, —$CFX_1$, O— wherein $X_1$=F, $CF_3$,
—$CF_2CF_2CF_2O$—, —$CF_2$—$CH_2CH_2O$—, $C_3F_6O$—.

7. Curable fluoroelastomers according to claim 4, wherein Z has formula:

$$-(Q)_p\text{-}CF_2O\text{—}(CF_2CF_2O)_m(CF_2O)_n\text{—}CF_2\text{-}(Q)_p\text{-} \quad (II)$$

wherein Q is a $C_1$-$C_{10}$ alkylene or oxyalkylene radical; p is 0 or 1; m and n are numbers such that the m/n ratio is between 0.2 and 5 and the molecular weight of said (per)fluoropolyoxyalkylene radical is in the range 500-10,000.

8. Curable fluoroelastomers according to claim 7, wherein Q is selected from: —$CH_2OCH_2$—; —$CH_2O(CH_2CH_2O)_sCH_2$—, s being=1-3.

9. Curable fluoroelastomers according to claim 4, wherein the bis-olefin has formula:

$$CH_2CH\text{—}(CF_2)_{tO}\text{—}CH\text{=}CH_2$$

wherein tO is an integer from 6 to 10.

10. Curable fluoroelastomers according to claim 4, wherein the bis-olefin has formula:

$$CH_2\text{=}CH\text{—}(CF_2)_6\text{—}CH\text{=}CH_2 \quad (b).$$

11. Curable fluoroelastomers according to claim 1, containing iodine in amounts between 0.001% and 5% by weight with respect to the total polymer weight.

12. Curable fluoroelastomers according to claim 11, wherein the iodine atoms are in the chain and/or in end position.

13. Curable fluoroelastomers according to claim 11, wherein, alternatively or in association with iodine, bromine, in the chain and in end position, is present.

14. A curable mixture comprising the VDF curable fluoroelastomers according to claim 1 and a semicrystalline (per)fluoropolymer in an amount up to 70% by weight based on the total of the dry weight of the fluoroelastomer and the semicrystalline (per)fluoropolymer.

15. The curable mixture according to claim 14, wherein the semicrystalline (per)fluoropolymer is constituted by tetrafluoroethylene (TFE) homopolymers, or TFE copolymers with one or more monomers containing at least one unsaturation of ethylene type, in amounts from 0.01% to 10% by moles, said comonomers having an ethylene unsaturation being of hydrogenated and fluorinated type.

16. The curable mixture according to claim 14, wherein the hydrogenated comonomers are selected from ethylene, propylene, acrylic monomers, styrene monomers.

17. The curable mixture according to claim 14, wherein the fluorinated comonomers are selected from the following:
$C_3$-$C_8$ perfluoroolefins;
$C_2$-$C_8$ hydrogenated fluoroolefins; $CH_2$=$CH$—$Rf$ perfluoroalkylethylene, wherein $R_f$ is a $C_1$-$C_6$ perfluoroalkyl;
$C_2$-$C_8$ chloro- and/or bromo- and/or iodo-fluoroolefins;
$CF_2$=$CFO$ $R_f$ (per)fluoroalkylvinylethers (PAVE), wherein $R_f$ is a $C_1$-$C_6$ (per)fluoroalkyl;
$CF_2$=$CFOX$ (per)fluoro-oxyalkylvinylethers wherein X is: a $C_1$-$C_{12}$ alkyl, or a $C_1$-$C_{12}$ oxyalkyl, or a $C_1$-$C_{12}$ (per)fluoro-oxyalkyl having one or more ether groups fluorodioxoles.

18. The curable mixture according to claim 14, wherein the comonomers are PAVES and fluorodioxoles.

19. Curable fluoroelastomers according to claim 10, having the compositions in percent by moles, (the sum of the molar percentages of the monomers being 100%) selected from the group consisting of:
monomer of formula (a): 25-50%; and
VDF: 50-75%;
monomer of formula (a): 25-50%;
VDF: 50-75%; and
bis-olefin of formula (b): 0.01-1%;
monomer of formula (a): 25-50%;
VDF: 50-75%;
TFE: 2-20% and
bis-olefin of formula (b): 0.01-1%;
monomer of formula (a): 25-50%;
VDF: 50-75%;
MVE (perfluoromethylvinylether): 2-20%; and
bis-olefin of formula (b): 0.01-1%;
monomer of formula (a): 25-50%;
VDF: 50-75%;
TFE: 0-10%;
MVE: 0-10%; and
bis-olefin of formula (b): 0.01-1%.

20. Curable fluoroelastomers having Tg lower than −49° C., according to claim 1, wherein the following vinylether (a1) MOVE 2 having formula: I+−

$$CF_2\text{=}CFOCF_2OCF_2CF_2OCF_3$$

is used instead of monomer a), in amounts from 18 to 35% by moles, comonomers B) being the complement to 100% of the sum of the molar percentages of the monomers.

21. Curable fluoroelastomers having Tg lower than −49° C. according to claim 1, wherein (in percent by moles):
monomer a) from 2 to 50%;
vinylether (a1) MOVE 2 having formula:

$$CF_2\text{=}CFOCF_2OCF_2CF_2OCF_3$$

in amounts from 2 to 35%;
comonomers B) being the complement to 100% of the monomer molar percentage.

22. Cured fluoroelastomers obtainable from the curable fluoroelastomers of claim 1.

* * * * *